No. 767,960.

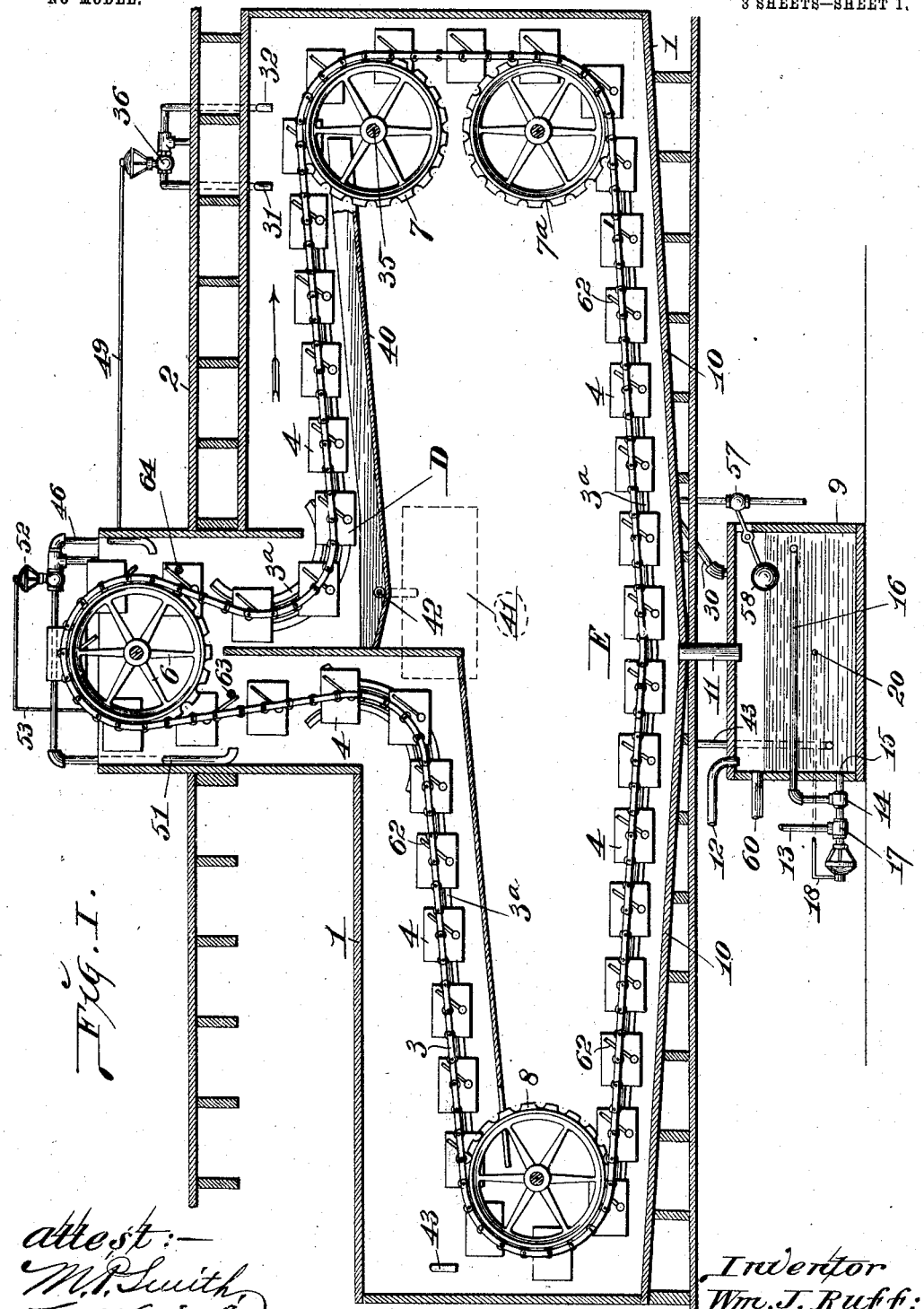

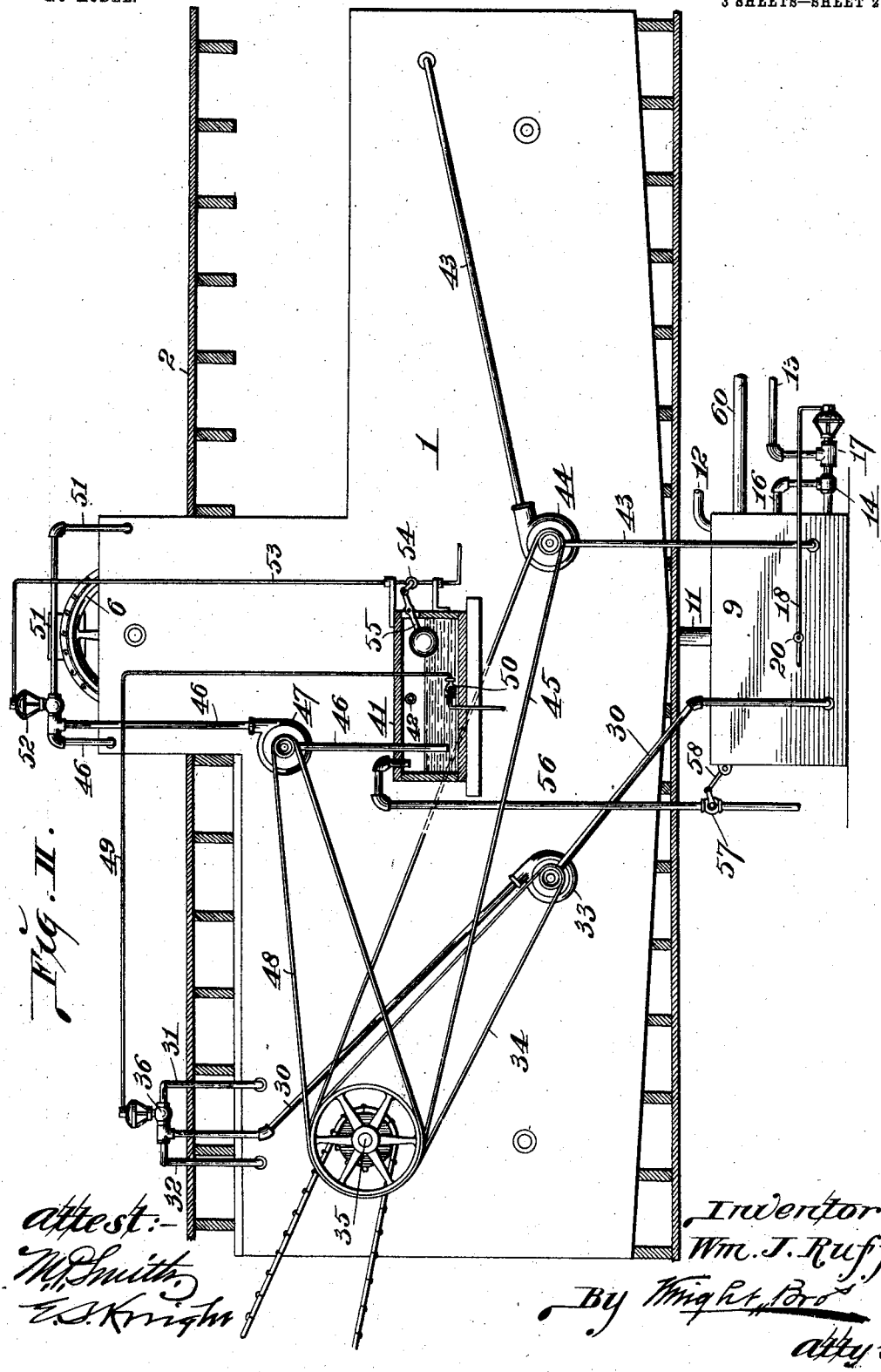

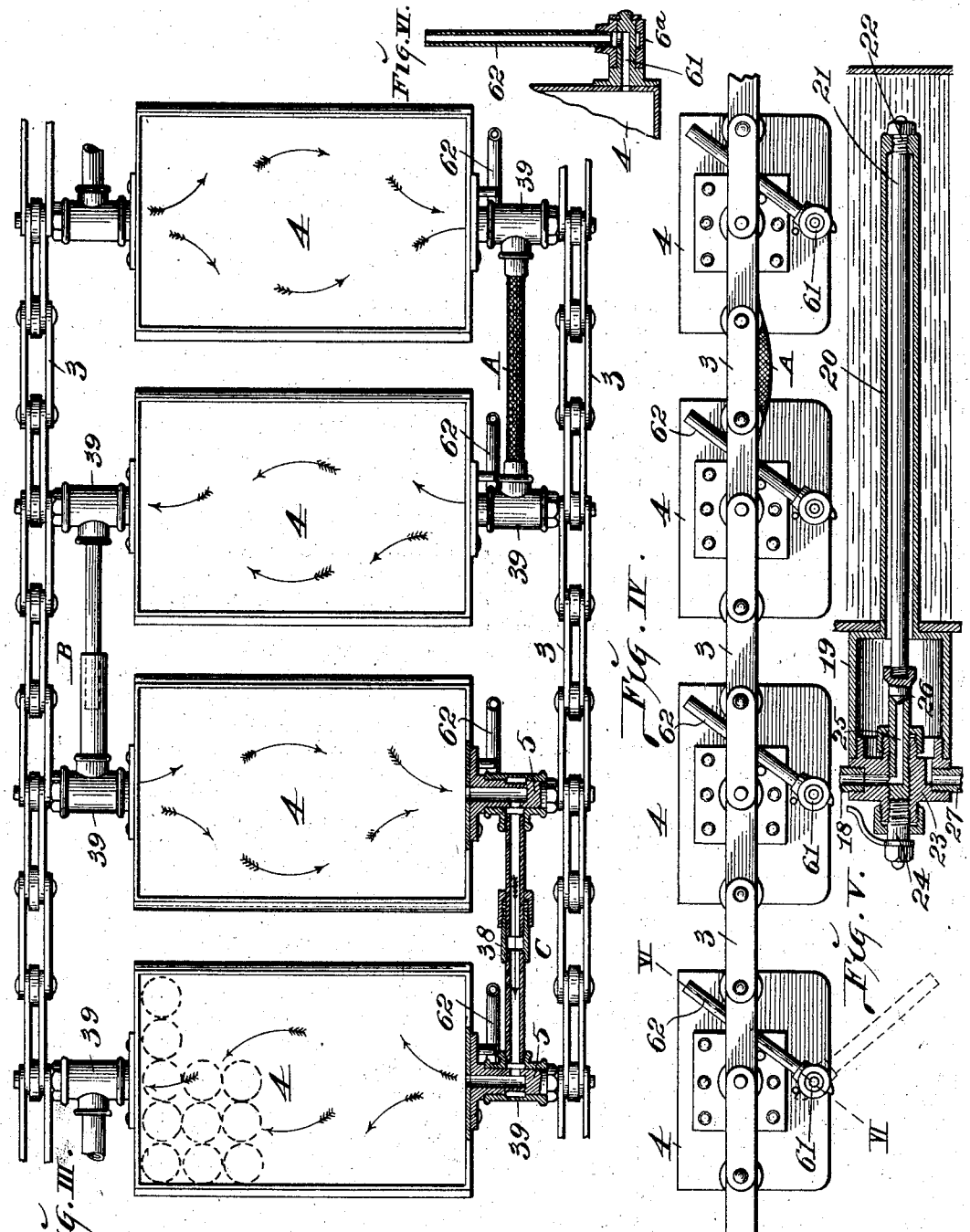

Patented August 16, 1904.

UNITED STATES PATENT OFFICE.

WILLIAM J. RUFF, OF QUINCY, ILLINOIS.

PASTEURIZER.

SPECIFICATION forming part of Letters Patent No. 767,960, dated August 16, 1904.

Application filed February 13, 1903. Renewed December 16, 1903. Serial No. 185,447. (No model.)

*To all whom it may concern:*

Be it known that I, WILLIAM J. RUFF, a citizen of the United States, residing in Quincy, in the county of Adams and State of Illinois, have invented certain new and useful Improvements in Pasteurizers, of which the following is a full, clear, and exact description, reference being had to the accompanying drawings, forming part of this specification.

My present invention relates to an apparatus for pasteurizing beer, one of the principal objects of my invention being to simplify the construction and cheapen the cost of the apparatus, as well as improving its efficiency, by dispensing with a tank through which the bottles of beer are carried to expose them to the different temperatures—to wit, in first attemperating the beer, then heating it to the maximum temperature, and finally cooling it to approximately atmospheric temperature.

My invention consists in features of novelty hereinafter fully described, and pointed out in the claims.

Figure I is a side elevation of my improved pasteurizer, the housing, drip-trough, and main supply-tank being shown in vertical section. Fig. II is a side elevation showing the auxiliary supply-tank in vertical section. Fig. III is an enlarged detail top or plan view, part in section. Fig. IV is an enlarged detail side elevation. Fig. V is an enlarged longitudinal section showing one of the regulators. Fig. VI is a detail section taken on line VI VI, Fig. IV.

Referring to the drawings, 1 represents a housing, that may be of any desired construction and which is preferably located beneath the floor 2 of a building. This housing is not indispensable; but I prefer to use it for the purpose of inclosing the working parts and protecting them from view and air-currents.

3 represents a pair of endless chains between which baskets or receptacles 4 are supported, preferably by means of stems or trunnions 5 projecting from the ends of the baskets, as shown in Fig. III. The baskets are adapted to receive the bottles of beer to be pasteurized, and they, with the chains, form the endless carrier of the apparatus. The chains pass over a pair of upper sprocket-wheels 6, behind a set of sprocket-wheels 7 7ª at one end of the machine, and behind a pair of sprocket-wheels 8 at the other end of the machine, the sprocket-wheels being secured to shafts suitably journaled in the housing 1 or other support.

3ª represents guide-rails for directing the movement of the chains.

9 represents a main water-supply tank that communicates with a drip-floor 10 through means of a pipe 11, the floor being inclined upwardly in both directions from the center of the machine, as shown in Fig. I. The tank 9 is initially supplied with water through means of a pipe 12, and the water in this tank is heated and maintained at the proper temperature for pasteurizing—say 148° Fahrenheit—through means of steam admitted to the tank through a pipe 13 and a jet-pump 14, such as is shown in Fig. VI of my Patent No. 607,770, dated July 19, 1898. The jet-pump connects with the tank through means of a lower pipe 15 and an upper pipe 16, the latter preferably extending a considerable distance across the tank, so that when the pump is working there will be a circulation of water from the upper part of the tank through the pump and into the lower part of the tank.

17 represents a diaphragm-valve such as is shown in Fig. VII of my Patent No. 701,622, dated June 3, 1902, in the pipe 15 outwardly beyond the pump 14. In order that this valve 17 may be automatically controlled to maintain a constant temperature of the water in the tank 9, I provide the regulator shown in Fig. V. The regulator connects with the diaphragm of the valve 17 by means of a pipe 18. The regulator consists of a cylinder 19, secured to the wall of the tank 9 and having a tube 20, that extends into the tank. Within the tube 20 is a thermostatic bar or rod 21, the inner end of which is made fast to the end of the tube, as shown at 22, Fig. V. In the outer end of the cylinder 19 is fitted a plug 23, into which is tapped a stem 24, having a port 25, that communicates with the pipe 18. The inner end of the stem 24 forms the seat for a valve 26 on the outer end of the thermostatic rod 21.

27 is a compressed-air pipe tapped into the plug 23 and which communicates with the interior of the cylinder 19. When the temperature in the tank 9 falls below a given point—say 148° Fahrenheit—the bar 21 will contract and open the valve 26. Compressed air will then pass through the pipe 27, (which is connected to a suitable compressed-air tank, not shown,) through the stem 24, and through the pipe 18 to the diaphragm-valve 17, thus causing the valve to be opened and starting up the jet-pump by the passage of steam through the pipe 13. When the temperature in the tank 9 is restored, the bar 21 will expand, closing the valve 26, thus stopping the action of the pump by shutting off the steam in the pipe 13. The stem 24 may be turned to adjust it inwardly or outwardly, so that the valve 26 will close sooner or later, thus enabling the operator to provide for the exact temperature desired in the tank 9.

I make no claim as inventor to the construction of the regulator which I have described, and any desired form of regulator may be used.

30 represents a pipe communicating with the supply-tank 9 and which extends to one of the upper corners of the machine, where it is provided with branches 31 and 32, that are located over the bottle-carrier, as shown in Fig. I. In the pipe 30 is a rotary pump 33 of any ordinary well-known construction, driven by a belt 34 from a pulley on a driving-shaft 35. When the machine is in operation, the pump 33 operates continuously and conducts water from the supply-tank 9 through the branch 32, from which it flows into the passing baskets of the carrier. A portion of the water passing through the pipe 30 escapes through the branch 31 of the pipe except when this branch is closed by an automatic diaphragm-valve 36, that corresponds in construction and operation to the valve 17. Water escaping through the branch 31 is deposited in the passing baskets of the carrier. It will be noted that the carrier moves in an upwardly direction toward the wheel 7 and as it leaves the wheel moves in a downwardly direction. The branch 31 of the pipe 30 deposits water into the baskets on the advance side of the wheel 7, and the branch 32 deposits water into the baskets on the other or retreating side of the wheel 7. The stems or trunnions 5 of the baskets are made hollow, as shown in Fig. III, and they are connected together by means of flexible pipes 38 and loose sleeves 39, the sleeves fitting loosely on the trunnions, so as to be free to turn as the carrier passes around the sprocket-wheels. The pipes may either be made of flexible tubing, as shown at A, Fig. III, or may be made of plain telescoping sections, as shown at B, or may be made of sections joined by a stuffing-box union, as shown at C. The trunnions of the baskets are connected together alternately at opposite ends of the baskets, as shown, so that water entering one end of each basket passes across the same and leaves at the other end, thereby producing a circulation of water through the baskets. As the water enters the baskets through the branch 31 of the pipe 30 it circulates through the baskets, passing from one to another until it reaches the lowest point, which is at D, Fig. I, and will here overflow into a catch-basin 40, from which it passes to the auxiliary tank 41 through a pipe 42, and the water entering the baskets through the branch 32 circulates from one basket to the next until it reaches the lowest point in the underrunning part of the carrier, which is at E, Fig. I, and here the water overflows onto the inclined floor 10, from where it passes into the supply-tank 9 through the pipe 11. It will thus be seen that while the bottles are passing from the wheels 7 to the point E there is a flow of water of the maximum temperature of 148° constantly circulated around them, and to prolong this period of exposure of the beer in the bottles to the maximum temperature I provide another pipe 43, that extends from the tank 9 to a point at the rear of the wheels 8. This pipe is provided with a rotary pump 44, driven from the shaft 35 by a belt 45. The pipe 43 deposits water into the baskets, and this water circulates from one basket to another to the point E, where it overflows and passes back into the tank 9.

Extending from the auxiliary tank 41 to a point near the supporting-wheel 6 of the carrier is a pipe 46, provided with a rotary pump 47, driven from the shaft 35 by a belt 48. This pipe deposits water from the tank 41 into the baskets as they descend from the supporting-wheel 6, and the water passes from one basket to another until it reaches the low point D of the carrier, where it overflows into the catch-basin 40 and passes back into the tank 41 through the pipe 42. This water provides for the initial warming of the beer, and it is maintained at the desired temperature by means of water passing from the tank 9 into the baskets through the branch pipe 31, which, as stated, passes from one basket to another until it reaches the point D, where it overflows into the catch-basin and enters the tank 41. For automatically controlling the passage of water through the branch pipe 31 I provide the diaphragm-valve 36, which is connected by a pipe 49 to a regulator 50, located in the tank 41. The construction and operation of this regulator is the same as that shown in Fig. V, of which a description has been given. It will thus be seen that the temperature of the water in the tank 41 is utilized to control the valve 36 and admit water from the maximum hot-water-supply tank 9 to regulate the heat of the attemperating or warming water in the tank 41.

For the purpose of cooling the bottles of beer while the carrier is passing from the wheels 8 to the wheels 6 I provide the pipe 46 with a branch 51, that terminates at a point near the wheels 6 on the opposite side of the wheels to the point where the attemperating-water is discharged into the baskets, as seen in Fig. I. This water circulates from one basket to another and cools off the beer in the bottles. It overflows from the baskets at about the location of the wheels 8 as it is caused to back up by the flow of water from pipe 43 into the baskets. The pipe 51 is provided with a diaphragm-valve 52 of the same construction and operation as the valves 18 and 36. With this diaphragm-valve connects a compressed-air pipe 53, provided with a valve 54, connected to a float 55, located in the tank 41. When the water rises in the tank 41 after the machine has been started in operation, the float opens the valve 54 and compressed air passes to and opens the valve 52 in the pipe 51, thus permitting a flow of water through the latter pipe for cooling the beer.

It is apparent that when the use of the machine is to be temporarily stopped or stopped for the time being and it is desired to remove all of the bottles from the baskets there will be less water escaping from the baskets at the point E than when the machine is in full operation, this difference being equal to the amount of displacement caused by the introduction of fresh bottles into the baskets, which has now been stopped or discontinued owing to the fact that it is desired to empty the machine. This diminished flow of water into the tank 9 must be compensated for, for the reason that the use of cooling-water is required for some time after the insertion of bottles into the baskets has been discontinued. To compensate for this diminished flow of water, I employ a pipe 56, connected with a water-main or other source of supply and which is provided with a valve 57, connected to a float 58, located in the tank 9. When the machine is in full operation, this float is held in its raised position and keeps the valve 57 closed. When the flow of water from the baskets into the tank 9 is diminished by no more bottles being placed in the baskets, the falling of the water in the tank 9 allows the float 58 to drop and open the valve 57, whereupon a flow of water passes through the pipe 56 into the tank 41, thereby keeping up a supply of water in tank 41 for cooling purposes.

60 represents an overflow-pipe through which water can pass from the tank 9 and prevent the overcharging of the tank in case this condition should be likely to arise.

It is desirable to have the baskets drained of water at the time that they reach the point where the bottles are taken from the baskets. To accomplish this, I provide each basket with a hollow stem 61 (see Fig. VI) near its bottom, upon which fits a sleeve 6ª, carrying a short pipe 62. Just before the baskets reach the wheels 6 these pipes come against a stationary stop 63, (see Fig. I,) causing them to be turned from an upwardly-inclined to a downwardly-inclined position, so that the water will drain from the baskets through the pipes and fall upon the inclined floor 10, from where it passes back into the tank 9 to be reused. As the baskets pass over the wheels 6 they are emptied and refilled with bottles, and as they are passing to a point beneath the pipe 46 the pipes 62 come against another stationary stop 64 and are moved from a downwardly to an upwardly inclined position, thus shutting off the escape of water from the baskets.

It will be seen from the foregoing that the bottles of beer are subjected to the action of attemperating-water from the point where the pipe 46 discharges to the point D of low elevation and on up to the point where the carrier passes around the wheels 7, and from here on the bottles are subjected to the maximum temperature until they reach the back of wheels 8, and from there on to the pipe 51 they are subjected to the action of the cooling-water discharging from pipe 51. The bottles are removed from the baskets with the beer fully pasteurized at the side of the machine where the pipe 51 is located, and fresh bottles are placed in the baskets on the side of the wheels 6 where the pipe 46 is located.

By a machine thus constructed the beer is attemperated, pasteurized, and cooled down without the use of any tank and by the use of water circulating from basket to basket while the carrier is moving to bring the respective baskets from the receiving to the discharge side of the wheels 6.

I claim as my invention—

1. In a pasteurizer, the combination of a single tank for holding attemperating and cooling water, a pump for conducting water from said tank, a pipe connected to said pump for attemperating the beer, another pipe connected to said pump for cooling the beer, a tank for holding water of maximum temperature, a pump for conducting water from the last-mentioned tank through a pipe, and a carrier for moving the bottles past the discharge ends of said pipes to receive water therefrom, substantially as set forth.

2. In a pasteurizer, the combination of a single tank for holding attemperating and cooling water, a pump for conducting water from said tank through a pipe for attemperating the beer and through another pipe for cooling the beer, a tank for holding water of maximum temperature, a pump communicating with the last-mentioned tank for conducting water therefrom through a pipe located over the first-mentioned pipe, diaphragm-valves located in said pipes, a regulator located in the first-mentioned tank and which is adapted to control the flow of water through both of said pipes, and a carrier for moving the bottles past the discharge ends of said pipes to receive water therefrom.

3. In a pasteurizer, the combination of a single tank for holding attemperating and cooling water, a tank for holding water of maximum temperature, a pump communicating with each of said tanks, pipes communicating with said pumps for conducting water from said tanks to attemperate, pasteurize and cool the beer, and a carrier for moving the bottles past the discharge ends of said pipes to receive the water therefrom.

4. In a pasteurizer, the combination of a single tank for holding attemperating and cooling water, a pump for conducting water from said tank through a pipe for attemperating the beer and through another pipe for cooling the beer, a tank for holding water of maximum temperature, a pump for conducting water from said tank through a pipe provided with a series of nozzles, and a carrier for moving the bottles past the discharge ends of said pipes to receive the water therefrom, whereby the beer is attemperated, pasteurized and cooled without having to be passed through a tank containing liquid to effect the different temperatures, substantially as set forth.

5. In a pasteurizer, the combination of a traveling carrier having baskets to receive the bottles of beer to be pasteurized, and means for discharging water into said baskets; said baskets being connected together so that the water will pass from one to another to a point of lower travel of the carrier, substantially as set forth.

6. In a pasteurizer, the combination of a traveling carrier having baskets to receive the bottles of beer to be pastuerized, means for discharging attemperating-water into said baskets, and means for discharging water of maximum temperature into said baskets; said baskets being connected together so that the water will pass from one to another, substantially as and for the purpose set forth.

7. In a pasteurizer, the combination of a traveling carrier having baskets to receive the bottles of beer to be pasteurized, means for discharging attemperating-water into said baskets at a point beneath which the carrier moves in a downwardly direction, and means for discharging water of maximum temperature into said baskets at a point to which the carrier moves in an upwardly direction and from which it moves in a downwardly direction; said baskets being connected together so that the water passes from one to another to points of lowest travel of the carrier, substantially as set forth.

8. In a pasteurizer, the combination of a traveling carrier having baskets to receive the bottles of beer to be pasteurized, means for discharging attemperating-water into said baskets at a point from which the carrier moves in a downwardly direction, means for discharging water of maximum temperature into said baskets at a point toward which the carrier moves in an upwardly direction and from which it moves in a downwardly direction, and flexible tubes forming communication between said baskets so that the water will pass from one to another, substantially as and for the purpose set forth.

9. In a pasteurizer, the combination of a traveling carrier having baskets adapted to receive the bottles of beer to be pasteurized, means for discharging attemperating-water into said baskets at a point from which the carrier moves in a downwardly direction, and means for discharging water of maximum temperature into said baskets at another point from which the carrier moves in a downwardly direction; said baskets being connected together so that the water will pass from one to another, substantially as set forth.

10. In a pasteurizer, the combination of a traveling carrier having baskets adapted to receive the bottles of beer to be pasteurized, and means for discharging water of maximum temperature into said baskets at a point from which the carrier moves in a downwardly direction; said baskets being connected together alternately at opposite ends so that the water will circulate through said baskets and pass from one to another, substantially as set forth.

11. In a pasteurizer, the combination of a traveling carrier having baskets to receive the bottles of beer to be pasteurized, means for discharging water of maximum temperature into said baskets at a point from which the carrier moves in a downwardly direction, and flexible tubes connecting said baskets together alternately at opposite ends so that the water will circulate through said baskets from one to another to the point of lowest travel of the carrier, substantially as set forth.

12. In a pasteurizer, the combination of a traveling carrier having baskets to receive the bottles of beer to be pasteurized, means for discharging attemperating-water into said baskets at a point from which the carrier moves in a downwardly direction, means for discharging water of maximum temperature into said baskets at a point toward which the carrier moves in an upwardly direction and from which it moves in a downwardly direction, and a catch-basin located between said two points of water-discharge; said baskets being connected together so that water will pass from one to another, substantially as set forth.

13. In a pasteurizer, the combination of a traveling carrier having baskets to receive the bottles of beer to be pasteurized, means for discharging attemperating-water into said baskets at a point from which the carrier moves in a downwardly direction, means for discharging water into said baskets at a point toward which the carrier moves in an upwardly direction and from which it moves in a downwardly direction, a catch-basin located between said two points of water-discharge, an inclined floor beneath said carrier, and a tank communicating with said inclined floor; said baskets being connected together so that the water will pass from one to another to the point of lowest travel of the carrier, substantially as set forth.

14. In a pasteurizer, the combination of a traveling carrier having baskets adapted to receive the bottles of beer to be pasteurized, an inclined floor located beneath said carrier, a tank communicating with said floor, means for heating the water in said tank, and means for conducting the water from said tank and discharging it into the baskets at a point from which the carrier moves in a downwardly direction; said baskets being connected together so that the water will pass from one to another to the point of lowest travel of the carrier, substantially as set forth.

15. In a pasteurizer, the combination of a traveling carrier having baskets to receive the bottles of beer to be pasteurized, a supply-tank, means for heating water in the supply-tank, and means for conducting water from said tank and discharging it into said baskets at a point from which the carrier moves in a downwardly direction; said baskets being connected together so that the water will pass from one to another, substantially as set forth.

16. In a pasteurizer, the combination of a traveling carrier having baskets adapted to receive the bottles of beer to be pasteurized, a supply-tank, means for heating water in the tank, means for conducting water from the tank and discharging it into said baskets at one end of the machine at a point from which the carrier moves in a downwardly direction, and means for conducting water from the tank and discharging it into the baskets at a point toward which the carrier moves in an upwardly direction; said baskets being connected together so that the water will pass from one to another to the point of lowest travel of the carrier, substantially as set forth.

17. In a pasteurizer, the combination of a traveling carrier having baskets to receive the bottles of beer to be pasteurized, a supply-tank provided with means for heating the water, a pipe for conducting the water from said tank and which is provided with branches, one of which discharges water into the baskets at a point from which the carrier moves in a downwardly direction and the other of which discharges water into the baskets at a point toward which the carrier moves in an upwardly direction; said baskets being connected together so that the water will pass from one to another, substantially as set forth.

18. In a pasteurizer, the combination of a traveling carrier having baskets to receive the bottles of beer to be pasteurized, means for discharging attemperating-water into said baskets at a point from which the carrier moves in a downwardly direction, connections between said baskets whereby the water is allowed to pass from one to another to a point from which the carrier moves in an upwardly direction where it overflows, a tank adapted to receive the overflow water, a pipe for discharging water of maximum temperature into said baskets at a point toward which the carrier moves in an upwardly direction, a diaphragm-valve located in said pipe, and a temperature-regulator located in said tank and adapted to control said valve, substantially as and for the purpose set forth.

19. In a pasteurizer, the combination of a traveling carrier having baskets to receive the bottles of beer to be pasteurized, an auxiliary tank, a pipe adapted to conduct attemperating-water from said tank and deposit it into the baskets at a point from which the carrier moves in a downwardly direction, a supply-tank provided with means for heating the water to a maximum temperature, a pipe for conducting water from the last-mentioned tank and depositing it into the baskets at a point toward which the carrier moves in an upwardly direction, a diaphragm-valve located in the last-mentioned pipe, and a regulator located in said auxiliary tank, and which is adapted to operate said valve; said baskets being connected together so that the water will pass from one to another to the point of lowest travel of said carrier between said two points of water-discharge, where it overflows and passes to said auxiliary tank, substantially as set forth.

20. In a pasteurizer, the combination of a traveling carrier having baskets adapted to receive the bottles of beer to be pasteurized, an auxiliary tank, and means for conducting water from said tank and discharging it into said baskets on the receiving side of the machine to attemperate the beer and on the discharge side of the machine for cooling the beer; said baskets being connected together so that the water will pass from one to another, substantially as set forth.

21. In a pasteurizer, the combination of a traveling carrier having baskets to receive the bottles of beer to be pasteurized, an auxiliary tank, a pipe for conducting water from said tank and discharging it on the receiving side of the machine to attemperate the beer and on the discharge side of the machine for cooling the beer, a diaphragm-valve located in the branch of the pipe that leads to the discharge side of the machine, a float in said tank, and a compressed-air pipe connecting with said diaphragm-valve and which is provided with a valve adapted to be operated by said float; said baskets being connected together so that the water will pass from one to another, substantially as and for the purpose set forth.

22. In a pasteurizer, the combination of a traveling carrier having baskets to receive the bottles of beer to be pasteurized, means for discharging attemperating-water into said baskets at a point from which the carrier moves in a downwardly direction, means for discharging water of maximum temperature into said baskets at a point from which the carrier moves in a downwardly direction, and means for discharging cooling-water into said baskets at a point toward which the carrier moves in an upwardly direction; said baskets being connected together so that the water will pass from one to another, substantially as set forth.

23. In a pasteurizer, the combination of a traveling carrier having baskets to receive the bottles of beer to be pasteurized, means for discharging attemperating-water into said baskets at a point from which the carrier moves in a downwardly direction, means for discharging water of maximum temperature into said baskets at a point from which the carrier moves in a downwardly direction, means for discharging water of maximum temperature into said baskets at a point toward which the carrier moves in an upwardly direction, and means for discharging cooling-water into said baskets at a point toward which the carrier moves in an upwardly direction; said baskets being connected together so that the water will pass from one to another substantially as set forth.

24. In a pasteurizer, the combination of a traveling carrier having baskets adapted to receive the bottles of beer to be pasteurized, a supply-tank, an auxiliary tank, means for conducting water of maximum temperature from said supply-tank and discharging it into said baskets at a point from which the carrier moves in a downwardly direction, means for conducting cooling-water from said auxiliary tank and discharging it into the baskets at a point toward which the carrier moves in an upwardly direction, a water-pipe 56 communicating with said auxiliary tank, and a float located in said supply-tank and connected to a valve in said water-pipe to open said valve when the water in the supply-tank falls beneath its normal level; said baskets being connected together so that the water will pass from one to another, substantially as set forth.

25. In a pasteurizer, the combination of a traveling carrier having baskets to receive the bottles of beer to be pasteurized, means for discharging water of maximum temperature into said baskets at a point from which the carrier moves in a downwardly direction, means for connecting the baskets together so that the water will pass from one to another, and for emptying said baskets consisting of pipes communicating with the lower parts of the baskets adapted to engage stops on the delivery side of the machine to drain the baskets and on the receiving side of the machine to close the baskets, substantially as set forth.

26. In a pasteurizer, the combination of a series of bottle-receptacles, means for discharging water into the receptacles and means for moving the bottle-receptacles past the point of water-discharge; said receptacles being connected together so that water will pass from one to another to effect respectively the attemperating, maximum heating, and cooling of the beer, substantially as set forth.

WILLIAM J. RUFF.

In presence of—
GERHARD G. ARENDS,
FRANK A. LUBBE.